March 23, 1926. 1,578,181
R. BALMER
SYSTEM OF DISTRIBUTION OF REFUSE DESTRUCTOR GASES
Filed March 22, 1924
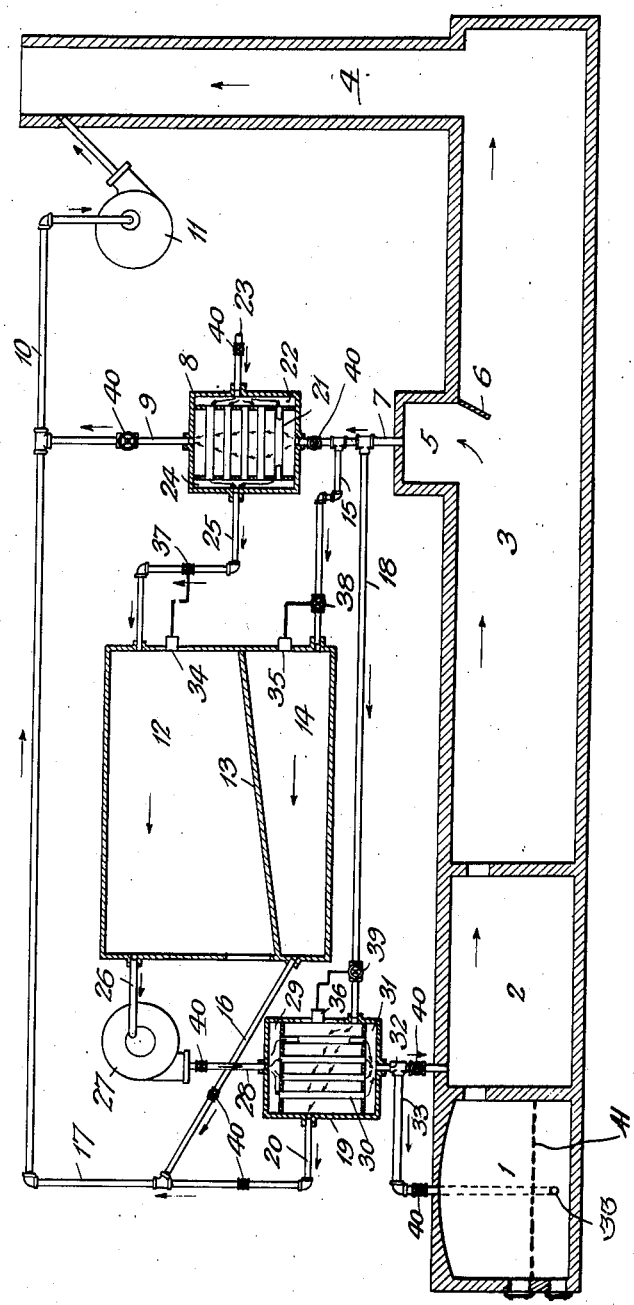
INVENTOR.
Robert Balmer
BY Seward Davis
ATTORNEY.

Patented Mar. 23, 1926.

1,578,181

UNITED STATES PATENT OFFICE.

ROBERT BALMER, OF TORONTO, ONTARIO, CANADA, ASSIGNOR TO THE BALMER CORPORATION.

SYSTEM OF DISTRIBUTION OF REFUSE-DESTRUCTOR GASES.

Application filed March 22, 1924. Serial No. 701,013.

*To all whom it may concern:*

Be it known that I, ROBERT BALMER, a subject of the United Kingdom of Great Britain and Ireland, a citizen of the Dominion of Canada, and a resident of the city of Toronto, in the Province of Ontario, in said Dominion, am the inventor or discoverer of certain new and useful Improvements in Systems of Distribution of Refuse-Destructor Gases.

My invention relates to a system of distribution of the gaseous products of secondary combustion of a refuse destructor.

It has for its objects the utilization of the heat therefrom by indirect application to a current of air circulating over the contents of a refuse-storage bin for treatment by preheating of the stored refuse preparatory to incineration thereof and by evaporation of the moisture therefrom; and to the recuperation of the air current laden with the vapors evaporated from such refuse preparatory to the return of the mixture as a combustion supporting medium to the ash pit of the primary, or to the secondary, combustion chamber, as desired.

Other objects attained by my invention will appear as pointed out in the following specification, with attendant features of advantage and utility as therein set forth and described.

With the recited objects in view, my invention consists in certain improvements in the arrangement of elements for heating refuse storage bins in refuse incinerators and in the novel application of forces developed in such destructor plants, as diagrammatically illustrated in the accompanying drawing forming a part of this specification. In this drawing is schematically represented a destructor plant in vertical section through a primary combustion chamber 1, communicating with a secondary combustion chamber 2, and a flue 3 therefrom to a stack 4. In the flue 3 is provided a dome 5 and a baffle 6 for diverting a part of the gaseous products of secondary combustion evolved in chamber 2 thereto. From this dome the main pipe 7 rises vertically as a main adapted to supply any of the branches therefrom as demand may be made. The pipe 7 is vertically terminated by a heat-exchange 8 through which the combustion gases introduced by pipe 7 may pass, leaving the heat-exchange by the pipe 9, which is a continuation of said pipe 7, and enters the horizontal pipe 10 leading to the exhaust fan 11, which vents into the stack 4. 12 is a garbage or refuse storage bin, having the inclined bottom 13 and the enclosed chamber 14 below it.

A pipe 15 branches from the main pipe 7 and extends to the chamber 14. From the chamber 14 extends the pipe 16 which enters the vertical pipe 17 of which pipe 10 is a continuation.

A pipe 18 branches from the main pipe 7 and extends to the heat-exchange 19 through which the combustion gases introduced by pipe 18 may pass, leaving the heat-exchange by the pipe 20, of which pipe 20 the pipe 17 is a continuation.

The heat-exchange 8 is a closed chamber housing a plurality of horizontal pipes 21 opening at their ends on one side into an ante-chamber 22 supplied with air through the pipe 23 entering same. The pipes 21 open at their other ends into a common chamber 24 from which extends the pipe 25 which opens into the storage bin 12. From this storage bin extends the pipe 26 to the blower 27, which acts also as an exhaust upon the bin 12. From this blower extends the pipe 28 to the heat-exchange 19, which consists of three chambers, arranged similarly to those of heat-exchange 8 previously described, namely, the ante-chamber 29 is connected by a plurality of parallel pipes 30 extending therefrom to the exit chamber 31, from which leads the pipe 32 which extends vertically downward to and enters the secondary combustion chamber 2. A branch 33 extends to and terminates in the ash pit of the primary combustion chamber 1. The chambers 12, 14 and 19 are respectively provided with thermostats, 34, 35 and 36, which are connected to and respectively control the several valves 37, 38 and 39 shown in their respective pipes 25, 15, 18 supplying these chambers, being adapted automatically to open or close said valves in accordance with the predetermined temperature range desired for a given chamber.

Valves for manual control of the admission of gaseous products of combustion are also located in pipes 7, 9, 16 and 20; and for control of air in pipe 23; and for control of the mixture of air and fumes or vapors from chamber 12 in pipes 28, 32 and 33, as shown, and as indicated by numeral 40.

Arrows along the chambers and pipes represent the direction of flow of currents therethrough.

The principles of operation of my system of distribution will next be explained in conjunction with the theory of utilization of the combustion products and the economies effected by my invention as well as the flexibility of temperature control in the bin and the wide range thereof attainable, which are further desired objects of my invention.

In my prior Patent No. 1,442,116, granted me January 16, 1923, there is shown and described a means for heating refuse storage bins which utilizes the heat radiated through the walls and crown of the furnace and combustion chamber. My present invention utilizes the hot gases of combustion for the same purpose, preferably taking these these gases from the flues after combustion has been completed. This difference in the immediate source of the heat improves the combustion conditions, since abstracting heat from the primary or secondary combustion chambers tends to retard combustion therein. As combustion is the prime desideratum in a furnace, any tendency to detract therefrom is, generally speaking, undesirable. By employing the heat of the gases after combustion instead of the radiation therefrom during combustion to effect the desired result of pretreatment of garbage and the like, additional features of comparative advantage result: first, the furnace and combustion chamber may be better insulated and their energy of combustion thereby conserved; second, the storage bins may be located independently and where desired and not necessarily in proximity to the furnace or combustion chamber, as is otherwise necessary, the gases being piped to them; third, a wider range of temperature becomes available; fourth, a quicker and more complete control of temperature is possible; fifth, automatic regulation of temperature of the storage bin is attainable; sixth, the same source of supply of hot gases may be used for heating the storage bin either indirectly by radiation from the bottom of the bin or indirectly by heating air supplied to the bin itself, or both; seventh, the same source of supply of hot gases may also be used for recuperating the mixture of air, gases, vapors and fumes drawn from the bin and which is blown under forced draught either under the primary combustion grate or to the secondary combustion chamber not only to be itself consumed but also to promote combustion of solids in the former or fluids in the latter, or both in either.

The hot gases above mentioned are preferably exhausted through a space or chamber constructed underneath the floor of the storage bin, as shown, to a suction fan and discharged preferably under pressure from the latter into the stack, as shown. The sole requirement in this regard is that the balance shall be maintained between the withdrawn and returned volumes so that the natural draft of the chimney shall not be materially reduced; and to this end the fan 11 will suffice as a compensator.

As will be clear to those skilled in the art, the arrangement of elements shown may be varied without impairment of their functional utilities in carrying out my system for utilizing flue gases for the treble purpose of heating refuse-storage bins, the air-supply to these bins and the mixture of air, gases and fumes exhausted therefrom and delivered under pressure to the furnace ash pit and combustion chamber. It will be obvious, for example, that the two heat-exchanges shown may be combined in a single frame-work while preserving their separate functional utilities. These are matters of engineering knowledge and skill, and do not require illustration, as they are not alternative constructions.

As will be understood by reference to my prior patent above cited, the refuse commonly known as "solid city waste" and including garbage, rubbish, ashes, street-sweepings, offal, dead animals, and the like matter, contains an excess of moisture content and is in a state of incipient fermentation and putrefaction. The condition of this waste demands some treatment to improve its combustibility. This treatment consists in preheating the refuse while stored in bins; withdrawing the vapors, gases and fumes evolved therefrom by such applied heat; and discharging the evolved fluids along with a controlled quantity of air under pressure into the furnace's ash-pit, thereby passing them through the fire-grate and the solid refuse already deposited thereon.

By my present method of evaporating the moisture from stored garbage, the gaseous products of secondary combustion, approximately at dust-fusion temperatures, are automatically supplied to a preheater, or to a heat-exchange which is adapted to supply air indirectly heated by said combustion gases, which preheater or heat-exchange, or both, supply heat to a predetermined temperature by radiation or convection, respectively, to the stored garbage, the heat-exchange supplying heated air under pressure in predetermined volumes.

The typical method of operation of the described system of distribution is effected as follows:

The refuse, on arrival at the destructor, is deposited in the bin 12 where it is stored and from which it is in due course to be withdrawn and charged into the furnace 1, upon a fire grate 41 therein. Through the chamber 14 hot gases are drawn from the flue 3 by way of the dome 5, due to the suction of the fan 11, passing through pipes 7, 15, 16, 17 and 10 to stack 4, preferably under a pressure sufficient to compensate the suction at 5.

The amount of hot gases drawn into the chamber 14 is controlled by a valve or damper 38, preferably operated by a thermostat regulator 35. Hitherto, as already explained, the bottom of the storage bin was heated at the expense of the efficiency of the furnace and combustion chamber, and with little or no flexibility in the control of temperatures.

One natural effect of the heat transmitted from the chamber 14 is to evaporate some of the moisture contained in the refuse in the bin 12. To prevent or minimize the recondensation of the water vapors within the bin is the purpose of the heat-exchange 8, which, similarly to the chamber 14, is heated by hot gases, which then discharge direct under pressure into the chimney through suitable connections and under control. Through suitable connections and control, atmospheric air is introduced into the heat-exchange 8, heated there and conveyed into and through the storage bin by suction of the blower. Hitherto, the warming of air entering the storage bin depended entirely on heat given off by radiation and convection from the furnace and combustion chamber and was inefficient as well as without effective control.

Besides water vapor, already noted, the application of heat to the refuse in storage produces gases and fumes. All of these vapors, gases and fumes, together with the greater part of the air required for the operation of the furnace and combustion chamber are drawn through and from the storage bin by the blower 27 and by it delivered through the heat-exchange 19 and from there into the furnace ash pit and combustion chamber, under suitable damper control with thermostat apparatus. Flue gases from the flue 3 are drawn through heat-exchange 19 by the fan 11 and then delivered under pressure into the chimney. The mixture of air, gases and vapors passing through heat-exchange 19 from the storage chamber are raised in temperature to any suitable degree, thus not only preventing condensation of the vapors and gases, but also adding to the temperatures directly resulting from combustion in the furnace and combustion chamber. It will be noted that the two heat-exchanges and the chamber 14 all derive their heat from one source,—the point 5 in the flue 3.

It will also be understood that the hot gases required for heating the double bottom of any refuse storage bin and the air, gases, vapors and fumes of same may be drawn from the flue of the same.

Having thus described my invention and pointed out a preferred means of practicing same, but not intending to be understood as limiting my invention to the particular embodiment illustrated, since the system is capable of application in widely diversified forms all of which are within the scope of my invention as defined in the appended claims,

I claim:

1. In a refuse destructor having a combustion chamber and a refuse storage chamber, a system of distribution of the gaseous products of secondary combustion comprising a heating chamber adjoining said storage chamber, a flue from said combustion chamber, pipes from said flue adapted to conduct the flue gases to said heating chamber, pipes from said heating chamber adapted to conduct the gases therefrom and to the stack, and a fan adapted to cause the gases to circulate through said pipes and heating chamber and to deliver said gases into said flue at a pressure adapted to equalize the loss occasioned by withdrawal of the gases from the combustion chamber.

2. In a refuse destructor having a combustion chamber and a refuse storage chamber exterior thereto, the system of distribution of the gaseous products of combustion comprising a heat-exchange and means adapted to circulate flue gases therethrough; a pipe connecting said heat-exchange to said storage chamber and a pipe from said storage chamber leading to said combustion chamber, and means adapted to move air through said heat-exchange and to circulate such heated air through said storage chamber, and to deliver the air mixed with vapors evolved by the refuse under the influence of heat in the storage chamber, to the combustion chamber.

3. In a refuse destructor having primary and secondary combustion chambers and a refuse storage chamber exterior thereto, the system of distribution of the gaseous products of secondary combustion comprising a heat-exchange and means adapted to circulate flue gases therethrough; a pipe connecting said heat-exchange to said storage chamber, and a pipe from said storage chamber having branches leading respectively to the ash pit of said primary combustion chamber and to said secondary combustion chamber, and means adapted to move air through said heat-exchange and circulate such heated air through said storage chamber and deliver the air mixed with vapors evolved by the refuse under the influence of heat in the storage chamber to the said ash pit of said primary combustion chamber and to the secondary chamber.

4. In a refuse destructor having a combustion chamber and a refuse storage chamber, the system of distribution of the gaseous products of combustion comprising a heating chamber adjoining said storage chamber, and means adapted to circulate flue gases therethrough; a heat-exchange adjacent said storage chamber, and means adapted to circulate flue gases through said heat-exchange; and means adapted to circulate air through said heat-exchange and said storage chamber.

5. In a refuse destructor having a combustion chamber and a refuse storage chamber, the system of distribution of the gaseous products of combustion comprising a heating chamber beneath said storage chamber, and means adapted to circulate flue gases therethrough; a heat-exchange adjacent said storage chamber, and means adapted to circulate flue gases through said heat-exchange; and means adapted to circulate air through said heat-exchange and said storage chamber, and to supply same to the combustion chamber.

6. In a refuse destructor having a combustion chamber and a refuse storage chamber, the system of distribution of the gaseous products of combustion comprising a heating chamber beneath said storage chamber, and means adapted to circulate flue gases therethrough; a heat-exchange adjacent said storage chamber, and means adapted to circulate flue gases through said heat exchange; and means adapted to circulate air through said heat exchange and said storage chamber and to supply same to the combustion chamber; and means adapted to recuperate the air prior to its entry into the combustion chamber.

7. In a refuse destructor having a combustion chamber and a refuse storage chamber, the system of distribution of the gaseous products of combustion comprising a heating chamber beneath said storage chamber, and means adapted to circulate flue gases therethrough; a heat-exchange adjacent said storage chamber, and means adapted to circulate flue gases through said heat-exchange; and means adapted to circulate air through said heat-exchange and said storage chamber and to supply same to the combustion chamber; and means adapted to recuperate the air prior to its entry into the combustion chamber, said means consisting of a heat-exchange heated by flue gases.

8. In a refuse destructor having a combustion chamber and a refuse storage chamber, the system of distribution of the gaseous products of combustion comprising a heating chamber beneath said storage chamber, and means adapted to circulate flue gases therethrough, and a thermostat adapted to control the temperature of said heating chamber by controlling the volume of such flue gases.

9. In a refuse destructor having a combustion chamber and a refuse storage chamber, the system of distribution of the gaseous products of combustion comprising a heat-exchange and means adapted to circulate flue gases therethrough; a pipe connecting said heat-exchange to said storage chamber and a pipe from said storage chamber leading to said combustion chamber, and means adapted to move air through said heat-exchange, and circulate such heated air through said storage chamber, and a thermostat adapted to control the temperature of said storage chamber by controlling the volume of air supplied thereto.

10. In a refuse destructor having a secondary combustion chamber and a refuse storage chamber, the system of distribution of the gaseous products of secondary combustion comprising means adapted to supply air to said storage chamber, means adapted to preheat said air, means adapted to withdraw such air from the storage chamber and to return it to the secondary combustion chamber, and a recuperator adapted to reheat said air after leaving the storage chamber and before it enters the combustion chamber.

ROBERT BALMER.